United States Patent [19]

Rosenberger

[11] 4,057,223
[45] Nov. 8, 1977

[54] MIXING BLOCK FOR MIXING POLYMERS
[75] Inventor: Roy R. Rosenberger, Wheaton, Ill.
[73] Assignee: Nalco Chemical Company, Oak Brook, Ill.
[21] Appl. No.: 619,551
[22] Filed: Oct. 3, 1975
[51] Int. Cl.² .......................... B01F 15/00; B01F 5/16; E03B 1/00
[52] U.S. Cl. .................................. 366/172; 137/604; 366/159
[58] Field of Search ............... 259/4 R, 18, 36, 95–96; 138/46, 104; 261/36 R, DIG. 75; 137/563, 604

[56] References Cited
U.S. PATENT DOCUMENTS

| | | | |
|---|---|---|---|
| 2,881,800 | 4/1959 | Bauerlein | 137/604 |
| 3,107,682 | 10/1963 | Young | 137/604 |
| 3,251,653 | 5/1966 | Aditya | 259/4 R |
| 3,468,322 | 9/1969 | Katzer | 137/604 |
| 3,807,434 | 4/1974 | Rasmussen | 137/604 |
| 3,848,858 | 11/1974 | Page | 138/46 |

Primary Examiner—Leonard D. Christian
Assistant Examiner—Robert Pous
Attorney, Agent, or Firm—John G. Premo; Robert A. Miller; Barry W. Sufrin

[57] ABSTRACT

A device for mixing viscous fluids with water comprising a rectangular block containing a pre-mixing chamber, a center section fitted with a bevelled double acting valve capable of restricting fluid flow in two distinct directions, an outlet chamber and recycling means for thoroughly mixing the viscous fluids with the water. The mixing device is able to balance both low and high back pressures, eliminate cavitation and deliver a mixture of viscous fluid and water without serious degradation of the components of the viscous fluids.

5 Claims, 6 Drawing Figures

MIXING BLOCK FOR MIXING POLYMERS

INTRODUCTION

The present disclosure concerns a device for mixing viscous fluids with water. The device achieves thorough homogenation without serious degradation of the components of the viscous fluids.

One important aspect of the invention resides in its "fluid balance" aspect. The mixing block is able to balance both low and high back pressures through the utilization of a unique double acting valve. This back pressure variation occurs at the point of discharge of the mixture of viscous fluid and water.

Another important aspect in the invention resides in the elimination of cavitation in the mixing or recycle aspect of the invention. Such cavitation or "running dry" is sometimes experienced in a recycle fluid line from which the fluid being recycled is rapidly removed.

Yet another important feature of the present invention is that it operates "in line" to deliver a viscous fluid and water mixture to a given destination. Thus, the need to utilize mix tanks prior to pumping the water and viscous fluid mixture to its intended destination is eliminated.

The above described features as well as other important advantages are achieved through the use of a double acting valve. This double acting valve, which is described in more detail herein, is able to restrict flow of a fluid in either one of two distinct directions without interferring with flow in the unrestricted direction.

The invention has been utilized with a viscous fluid comprising a water-in-oil emulsion containing dispersed therein finely divided particles of a water-soluble vinyl addition polymer or gum. Such polymer containing emulsions will be referred to herein as polymer lattices (singular: latex). Inversion of these lattices is achieved in the presence of water as described in U.S. Pat. No. 3,624,019, which is hereby incorporated by reference.

DRAWINGS

DETAILED DESCRIPTION OF THE DRAWINGS

Figure 1:
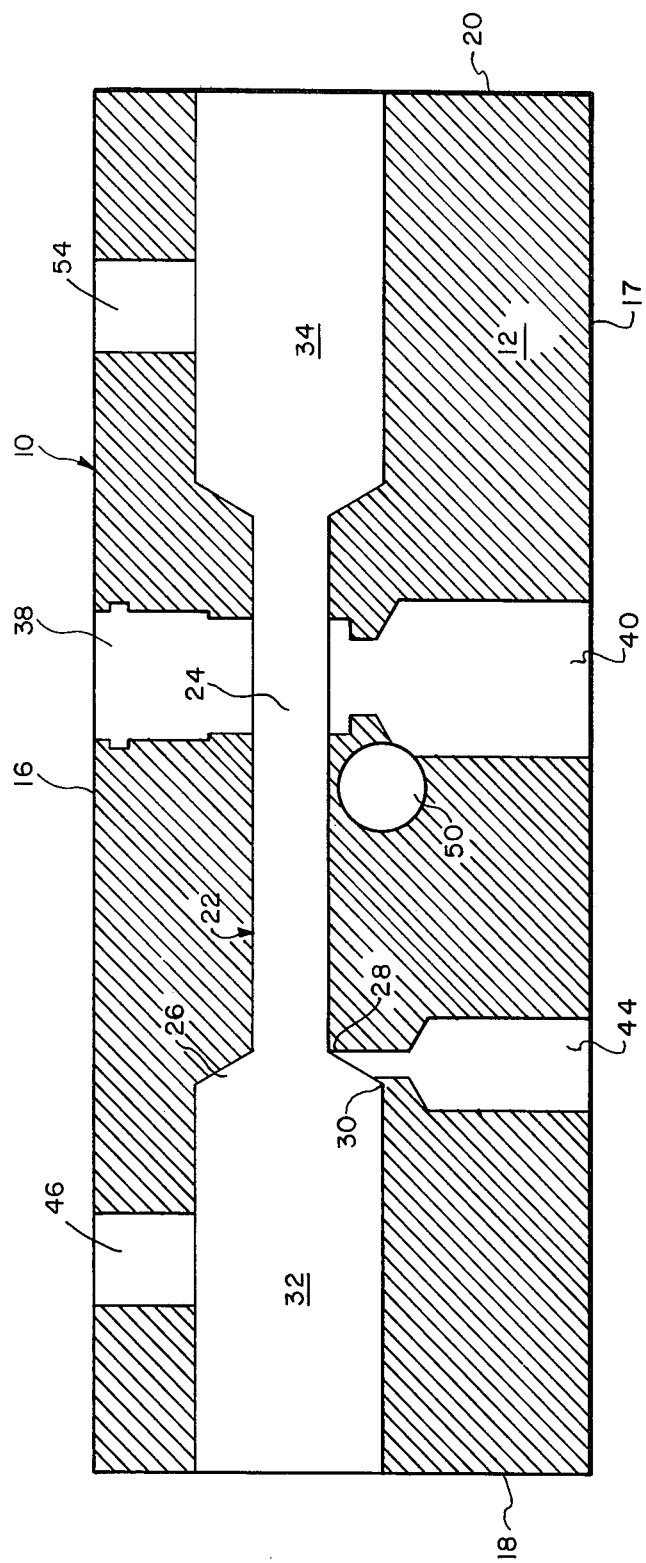
FIG. 1 is a broken away front view of the mixing block of the invention.

With specific reference to the drawings, and in particular FIG. 1, there is shown a substantially rectangular block which is generally designated by the number 10. The block has a front 12, a back 14, a top 16, a bottom 17, a first end 18 and a second or discharge end 20.

The block 10 is so constructed that it contains throughout its longitudinal axis a bore 22. The bore is so constructed that its center section 24 is substantially cylindrical and is of relatively small diameter in relation to the remainder of the bore.

Figure 2:
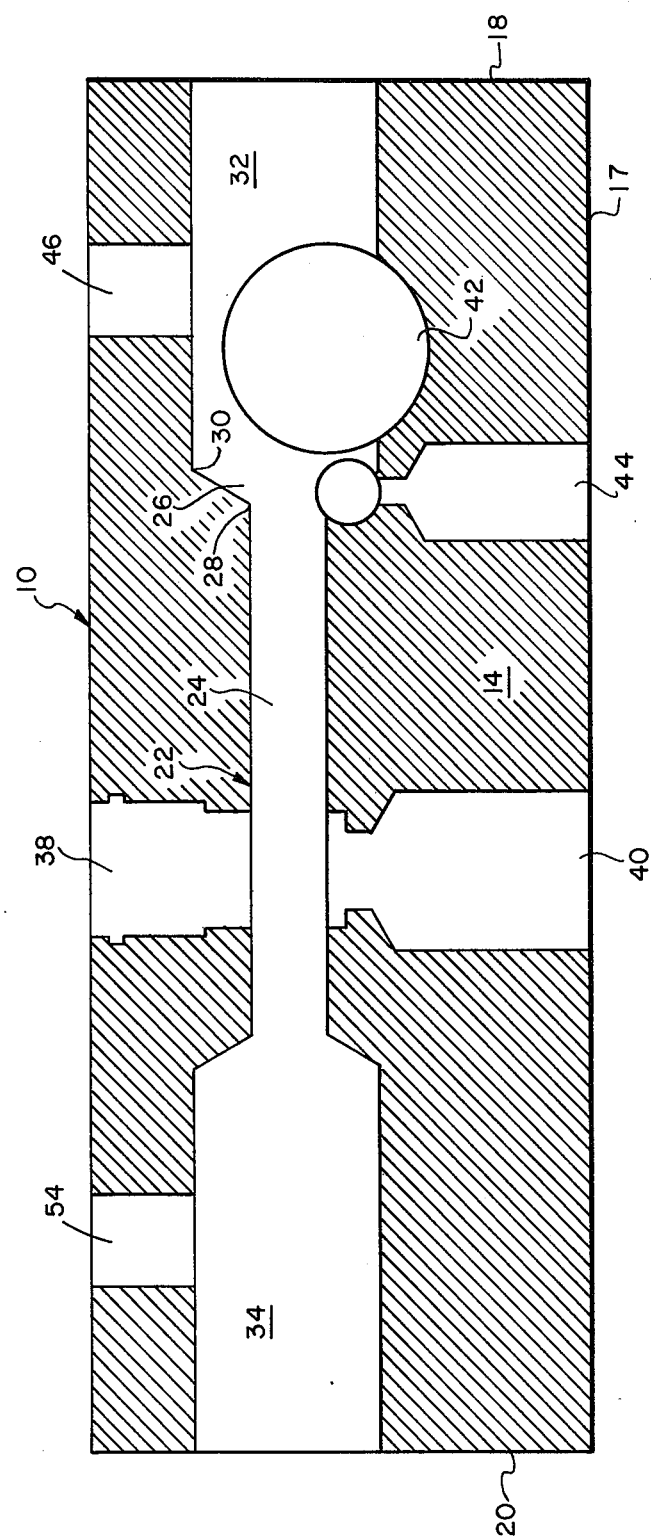
FIG. 2 is a broken away in part back view of the mixing block of the invention.
Figure 3:
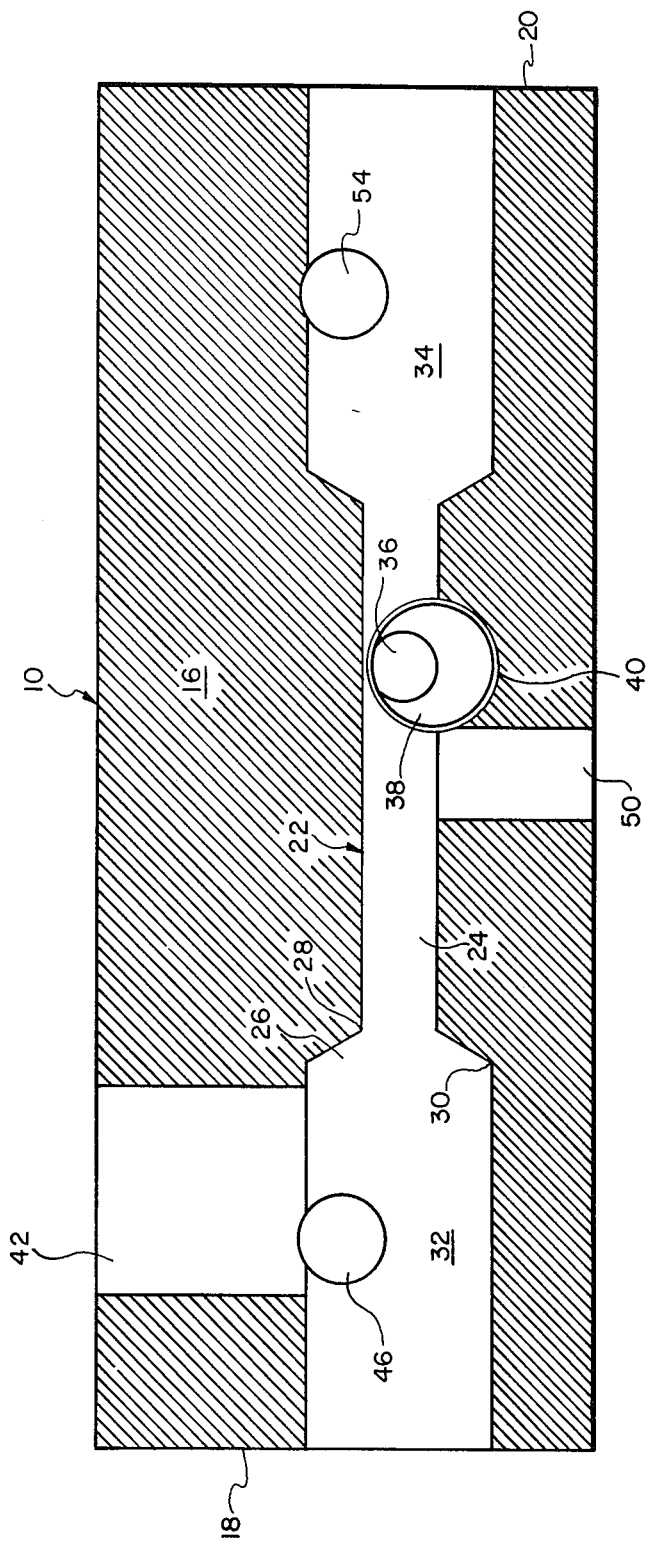
FIG. 3 is a top view broken away in part showing the mixing block of the invention.

As shown in FIGS. 1–3, the left end of the center section of the bore is flared. This flared section, generally designated by the numeral 26, is composed of an apex 28 and a base portion 30. Continuing from the base of the flared section 30, the bore forms left section 32 which opening extends throughout the remainder of the block and exits through end 18. It should be noted that this larger section 32 is of substantially greater diameter than the center section 24 of the bore 22.

The other end of the bore is constructed similarly to section 32. This right section, designated generally by the numeral 34, is constructed so that its beginning flares outwardly from the center section. The right section 34 terminates at the end of the block 20.

Thus it can be seen that the bore of the block contains three distinct zones or compartments. The portion of the bore designated 32 may be considered as a pre-mixing chamber, whereas the center section 24 is a mixing chamber, as will be more fully explained hereinafter, the right section 34 is an outlet chamber.

The bottom 17 of the block 10 contains a recycle inlet 40 which communicates with the center section 24.

The top 16 of the block 10 contains an opening 38 which communicates with the center section 24 and the recycle inlet 40. The axis of opening 38 is offset from the axis of recycle inlet 40. An adjustable valve 36 is fitted into opening 38 and communicates with the center section 24, the recycle inlet 40 and the discharge end 20.

The adjustable valve is generally designated by the numeral 36 and is in the form of a cylindrical plug. The valve is constructed so that its bottom portion 58 has a bevelled face 60 which terminates at tip 59. The upper portion of the valve contains 2 circumferential shoulders with the bottom shoulder 62 being parallel to the top shoulder 64 and separated therefrom thereby defining a groove 66 which is fitted with an O-ring 70. The top conferential shoulder 64 contains a slot 68 which allows the valve 36 to be adjusted by mechanical means such as a screwdriver blade.

The design of the bevelled face 60 is critical to the operation of the mixing block. As shown in the drawing, the bevel is 45°, although it may be varied between 60° and 30°.

A water inlet 42 is located in the back 14 of the mixing block and is in communication with the left section 32.

Figure 4:
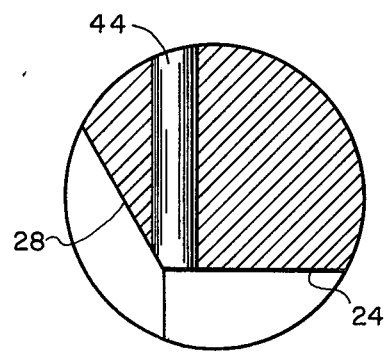
FIG. 4 is a detailed view showing the positioning of the high viscosity fluid inlet port within the block.
Figure 5:
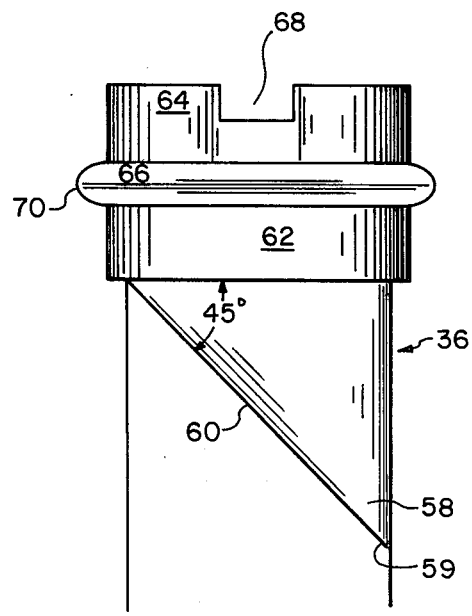
FIG. 5 is a vertical view of the adjustable valve mechanism used to control the pressure within the block; and, FIG. 6 is a horizontal schematic view showing the flow patterns which occur within the block when it is used to mix high viscosity fluids with water.

A high viscosity fluid inlet 44 is located in the bottom 17 of the block and is positioned so as to communicate with the apex of the flare 28 and the center section 24, as illustrated in detail in FIG. 4.

Figure 6:
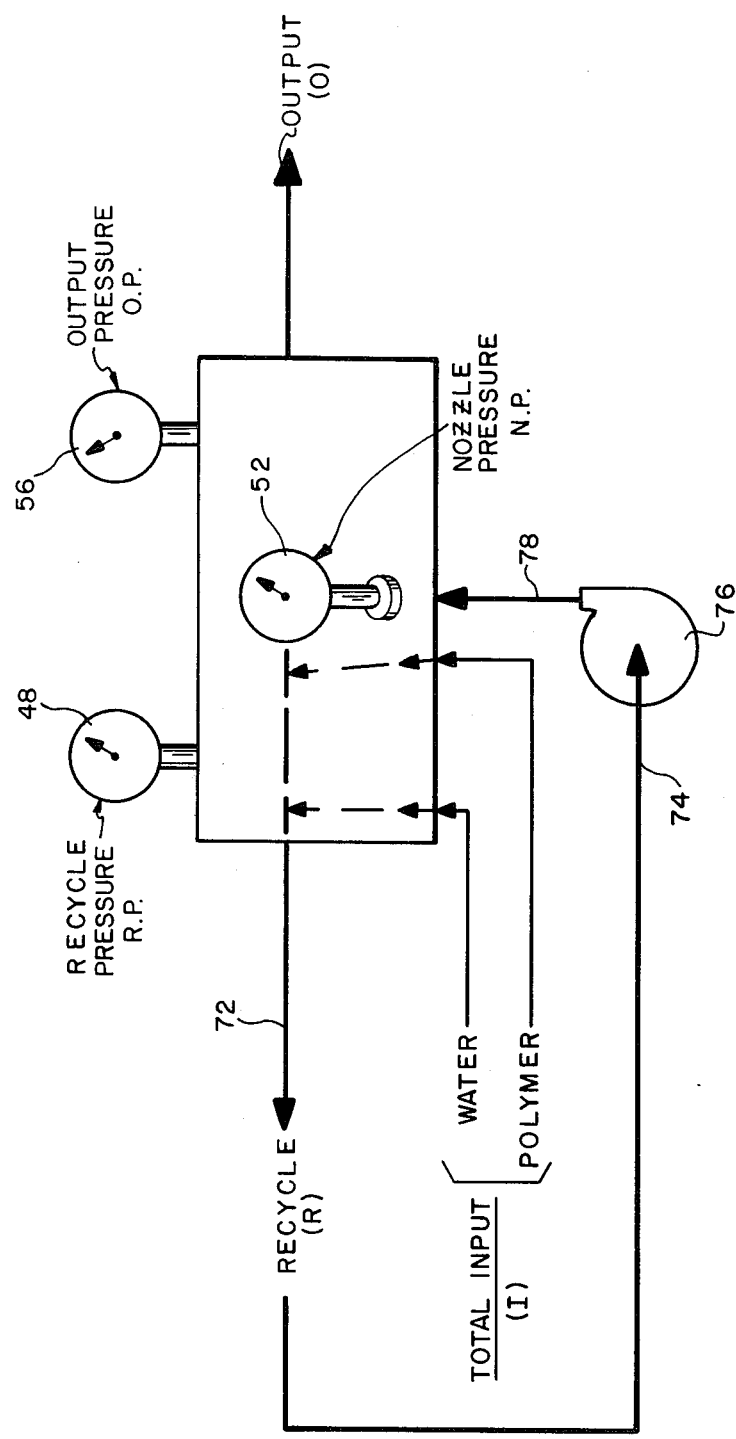

A recycle pressure gauge port 46 is located in the top 16 of the mixing block and communicates with the left section 32. The recycle pressure gauge port is fitted with a pressure gauge 48 as shown in FIG. 6.

The block 10 optionally includes a nozzle pressure valve port 50 and a nozzle pressure gauge 52. The nozzle pressure gauge port is located in the front 12 of the block in communication with the recycle inlet 40. The nozzle pressure gauge port is fitted with a nozzle pressure gauge 52 as shown in FIG. 6.

The block 10 optionally includes a discharge or output pressure valve port 54 and a discharge or output pressure gauge 56. The output pressure gauge port is located in the top 16 of the block in communication with the right center section 34. The output pressure gauge port 54 is fitted with an output pressure gauge 56, as shown in FIG. 6.

The mixing block thus far described, as is previously indicated, operates to rapidly and efficiently mix water and high viscosity fluids to produce uniform dispersions, mixtures or solutions thereof. To better understand the invention and its mode of operation, the following additional detailed description is given. For purposes of specifically illustrating how the device is utilized, the high viscosity fluid will be referred to as a latex polymer such as described in U.S. Pat. No. 3,624,019.

Water from a source not shown is fed into the mixing block through water inlet 42. It is fed by a suitable flexible conduit or fixed pipe not shown. This conduit or pipe may be fitted with a pressure regulating valve to control the water pressure entering the water inlet.

Latex polymer is fed into the mixing block through high viscosity fluid inlet 44. Latex polymer is normally supplied to users in 55 gallon drums. In order to feed the latex polymer to the mixing block, it is customary to fit the drum with a spigot and a flexible hose which, in turn, is fitted to the inlet side of a metering pump not shown. The output side of the metering pump, through appropriate piping and valve, is fed to the high viscosity fluid inlet 44.

The high viscosity fluid inlet 44 is positioned so that it communicates with the apex of the flare 28 and the center section 24, as illustrated in FIG. 4. A venturi effect is achieved by this design whereby the latex polymer is educted into the latex-water mixture which is flowing past the flare 28. This causes excellent low-shear type mixing to occur.

As shown to best advantage in FIG. 3, the end of the left section is fitted with a fluid conductor or line 72 which conducts the water and latex polymer to the input side 74 of the centrifugal pump 76 where the two components are blended and discharged through line 78 into recycle inlet 40 of the mixing block. The left section 32, the line 72, the centrifugal pump 76, the line 78 and the recycle inlet define a recycle circuit. As can be seen in FIG. 1, when the mixture of latex polymer and water enters the mixing block through recycle inlet 40 it is channelled upwardly into the center section 24 of the bore 22. As the mixture of water and latex polymer emerges into the center section 24, it comes in contact with the adjustable valve 36.

The adjustable valve 36 is positioned within the opening 38. The axis of the opening 38 which is located above recycle inlet 40 is offset from the axis of the recycle inlet. The valve bore is offset in this manner so that when the adjustable valve is in its neutral position with the bevelled face 60 facing forward, there is no obstruction between the center section 24 and the left section 32.

The adjustable valve 36 is positioned so that its bevelled face 60 is located within the center section 24 with the tip of the bevel 59 positioned slightly above the surface of the center section 24. The space which is defined between the tip of the bevel 59 and the surface of the center section 24 insures that flow to the right section 34 and to the left section 32 will never be totally restricted. For example, when the bevelled face 60 of the mixing valve 36 faces to the left of FIG. 1, it is apparent that the greater part of the mixture of latex polymer and water enters the center section 22 and is discharged through the left section 32 and back through line 72. Thus, as long as a mixture of latex polymer and water are being circulated through left section 32, through line 72 and back into recycle 40 inlet, a lesser amount of fluid will always be leaving the mixing block through right section 34, which is in most instances fitted with rigid or flexible piping to feed the finished mixture to an area or container to where it is to be employed.

The design of the valve 36, as discussed earlier, is unique in that it makes possible the adjustment of the pressure in the left section 32 and the associated recycle circuit wherein thorough mixing of latex and water is being achieved while allowing the latex and water mixture to be discharged through the right section under any given backpressure experienced at this point.

An important feature of the invention resides in the fact that when the mixture of latex polymer and water is injected through recycle inlet 40 which is of substantially larger diameter than the center section 24, a great deal of turbulence and agitation will develop within section 24 due to the throttling-down effect occasioned by the entry of the latex polymer and the water into this narrowed or constricted passageway. It is this feature which causes excellent agitation and mixing of the latex polymer and water, thereby causing the polymer to rapidly dissolve in but a matter of seconds.

Practical experience with devices of this type have indicated that water and latex polymer may be completely admixed and the polymer inverted into water to produce a clear, homogeneous polymer solution in a fraction of a second.

As has been previously explained, other valving may be placed within suitable ports located within the block to determine the pressure and pressure differentials within the system. The only critical pressure gauge is pressure gauge 48 which allows an unskilled plant operator to determine whether or not a positive pressure is being maintained within the center section 24 and line 72. By watching the valve and upon noticing a drop in pressure, it is possible to make a small adjustment on the adjustable valve 38 whereby a positive pressure may be established within center section 24 and line 72. Maintenance of this positive pressure is necessary to prevent cavitation in the centrifugal pump and piping recycling the latex water mixture.

I claim:

1. A device for rapidly mixing high viscosity fluid from a high viscosity fluid source with water from a water source comprising a substantially rectangular block with a bore extending throughout its entire length, said bore having a center section, a first end section and a second end section with the center section of the bore being of smaller diameter than the first end section, with the first end section containing a recycle outlet and defining a pre-mixing chamber for mixing the high viscosity fluids and the water with the center section partially outwardly flared where it joins the pre-mixing chamber with said flared portion having an apex and a base with the second end section defining an outlet port for discharging a mixture of high viscosity fluids and water, a high viscosity fluid inlet nozzle in communication with the apex of the flared portion of the pre-mixing chamber, said nozzle being adapted to adduct high viscosity fluids into the pre-mixing chamber, a water inlet in communication with the pre-mixing chamber, means for determining the pressure within the pre-mixing chamber, adjustable flow restricting means positioned within the center section of the bore, said flow restricting means being adapted to regulate the flow through the pre-mixing chamber and through the second end section wherein the adjustable flow restricting means is a cylindrical plug having a bevelled face in partial communication with the center section of the bore, a recycle inlet in communication with said adjustable flow restricting means and recycling means comprising a pump and fluid conductors connecting the recycle outlet and the recycle inlet for recycling a portion of a mixture of high viscosity fluid and water.

2. The device of claim 1 wherein the second end section is fitted with a pressure determining means.

3. A device for rapidly mixing high viscosity fluid from a high viscosity fluid source with water from a water source comprising a substantially rectangular block with a bore extending throughout its entire length, said bore having a center section, a first end second and a second end section with the center section of the bore being of smaller diameter than the end section, with the first end section containing a recycle outlet and defining a pre-mixing chamber for mixing the high viscosity fluids and the water with the center section partially outwardly flared where it joins the pre-mixing chamber with said flared portion having an apex and a base with the second end section defining an outlet port for discharging a mixture of high viscosity fluids and water, a high viscosity fluid inlet nozzle in communication with the apex of the flared portion of the pre-mixing chamber, said nozzle being adapted to adduct high viscosity fluids into the pre-mixing chamber, a water inlet in communication with the pre-mixing chamber, means for determining the pressure within the pre-mixing chamber, adjustable flow restricting means positioned within the center section of the bore, said flow restricting means being adapted to regulate the flow through the pre-mixing chamber and through the second end section wherein the adjustable flow restricting means is a cylindrical plug having a bevelled face in partial communication with the center section of the bore, a recycle inlet in communication with said adjustable flow restricting means and recycling means comprising a pump and fluid conductors connecting the recycle outlet and the recycle inlet for recycling a portion of a mixture of high viscosity fluid and water.

4. The device of claim 3 wherein the second end section is fitted with a pressure determining means.

5. A device for rapidly mixing high viscosity fluid from a high viscosity fluid source with water from a water source comprising a substantially rectangular block with a bore extending throughout its entire length, said bore having a center section, a first end section and a second end section, with the first end section containing a recycle outlet and defining a pre-mixing chamber for mixing the high viscosity fluids and the water with the second end section defining an outlet port for discharging a mixture of high viscosity fluids and water, a high viscosity fluid inlet nozzle in communication with the pre-mixing chamber, a water inlet in communication with the pre-mixing chamber, means for determining the pressure within the pre-mixing chamber, adjustable flow restricting means positioned within the center section of the bore, said flow restricting means being adapted to regulate the flow through the pre-mixing chamber and through the second end section wherein the adjustable flow restricting means is a cylindrical plug having a bevelled face in partial communication with the center section of the bore, a recycle inlet in communication with said adjustable flow restricting means and recycling means comprising a pump and fluid conductors connecting the recycle outlet and the recycle inlet for recycling a portion of a mixture of high viscosity fluid and water.

* * * * *